United States Patent
Abels et al.

(10) Patent No.: US 10,820,968 B2
(45) Date of Patent: Nov. 3, 2020

(54) ORTHODONTIC DEVICE

(71) Applicant: Norbert Abels, Homburg (DE)

(72) Inventors: Norbert Abels, Homburg (DE); Claus Backes, Saarbrücken (DE)

(*) Notice: Subject to any disclaimer, the term of this patent is extended or adjusted under 35 U.S.C. 154(b) by 0 days.

(21) Appl. No.: 15/567,510

(22) PCT Filed: Apr. 18, 2016

(86) PCT No.: PCT/EP2016/058522
§ 371 (c)(1),
(2) Date: Oct. 18, 2017

(87) PCT Pub. No.: WO2016/169881
PCT Pub. Date: Oct. 27, 2016

(65) Prior Publication Data
US 2018/0116767 A1    May 3, 2018

(30) Foreign Application Priority Data
Apr. 20, 2015   (LU) .......................................... 92697

(51) Int. Cl.
*A61C 7/36* (2006.01)
(52) U.S. Cl.
CPC ...................................... *A61C 7/36* (2013.01)
(58) Field of Classification Search
CPC .... A61C 7/36; A61C 7/00; A61C 7/20; A61C 7/22; A61C 5/07; A61C 5/007
USPC ..................................................... 433/18–21
See application file for complete search history.

(56) References Cited

U.S. PATENT DOCUMENTS

| | | | | |
|---|---|---|---|---|
| 3,618,214 A * | 11/1971 | Armstrong | ............... | A61C 7/36 267/168 |
| 3,772,789 A * | 11/1973 | De Weoskin | ............ | A61C 7/06 433/21 |
| 4,795,342 A | 1/1989 | Jones | | |
| 5,046,948 A * | 9/1991 | Miura | ...................... | A61C 7/00 433/18 |
| 5,074,784 A * | 12/1991 | Sterrett | .................... | A61C 7/36 433/18 |

(Continued)

FOREIGN PATENT DOCUMENTS

| CN | 201108508 Y | 9/2008 |
|---|---|---|
| CN | 101816591 A | 9/2010 |

(Continued)

OTHER PUBLICATIONS

European Patent Office, International Search Report in International Patent Application No. PCT/EP2016/058522, dated Jul. 11, 2016, 4 pages.

(Continued)

*Primary Examiner* — Sean M Michalski
*Assistant Examiner* — Shannel N Wright
(74) *Attorney, Agent, or Firm* — Leydig, Voit & Mayer, Ltd.

(57) ABSTRACT

An orthodontic device comprising a biasing member and first and second anchors for attaching the biasing member within a patient's mouth, wherein the biasing member exerts a bias under compression or extension, wherein the biasing member comprises a limiter for preventing movement of the biasing member past a predetermined limit, and wherein at least one of the first and second anchors is inelastic.

9 Claims, 11 Drawing Sheets

(56) References Cited

U.S. PATENT DOCUMENTS

| | | | | |
|---|---|---|---|---|
| 5,312,247 | A | * | 5/1994 | Sachdeva ................ A61C 7/10 |
| | | | | 433/18 |
| 5,545,037 | A | | 8/1996 | Tekeshi |
| 5,562,445 | A | | 10/1996 | DeVincenzo et al. |
| 5,738,514 | A | * | 4/1998 | DeVincenzo ............ A61C 7/36 |
| | | | | 433/18 |
| 5,964,588 | A | * | 10/1999 | Cleary .................... A61C 7/36 |
| | | | | 433/18 |
| 2002/0164555 | A1 | * | 11/2002 | Vogt ........................ A61C 7/36 |
| | | | | 433/19 |
| 2003/0157455 | A1 | * | 8/2003 | Teramoto ................ A61C 7/10 |
| | | | | 433/18 |
| 2011/0269094 | A1 | | 11/2011 | Shearer |

FOREIGN PATENT DOCUMENTS

| | | |
|---|---|---|
| CN | 102462541 B | 5/2014 |
| WO | WO 2008/061725 A1 | 5/2008 |
| WO | WO 2012/150494 A1 | 11/2012 |

OTHER PUBLICATIONS

European Patent Office, Written Opinion in International Patent Application No. PCT/EP2016/058522, dated Jul. 11, 2016, 7 pages.

* cited by examiner

ORTHODONTIC DEVICE

TECHNICAL FIELD

Embodiments of the invention relate to an orthodontic device and an orthodontic device for applying a bias, in particular. Further embodiments extend to a corresponding method.

BACKGROUND

The correction of dental malocclusions involves the use of different types of orthodontic devices. A number of these devices relate to the application of forces between teeth.

Orthodontic devices comprised of elastic materials such as rubber bands have been used extensively to apply forces between teeth. However, such elastic materials suffer from the disadvantage that they tend to deform over time and therefore it is necessary for these devices to be replaced relatively often; sometimes on a daily basis. The replacement then often depends on the patient reducing the amount of control that the orthodontic practitioner can exercise over the treatment.

Furthermore, an elastic material will lose its elastic properties if extended past a limit.

Any elastic orthodontic device exerting a bias when extended potentially suffers from the same disadvantage. When the device is extended past a limit, the material will permanently deform, and the device will lose its elastic properties.

It is therefore desirable to provide an orthodontic device which exerts bias, but which tends not to undergo permanent deformation and thereby lose its elastic properties.

U.S. Pat. No. 5,074,784 describes an orthodontic device comprising two elastic tensioning members and a coil spring arranged so that the tensioning members place the coil spring under compression in use. Since the tensioning members are made of an elastic material, this device suffers from the same disadvantages that other devices of the prior art do: the tensioning members will tend to deform and thereby lose their elasticity over time. The coil spring of the arrangements does not counter an extension to the device caused by deformity in the tensioning members.

WO 2012/150494 A1 discloses an orthodontic appliance having sliding rods. One of the rods is located within a sleeve and a spring biases movement of the rod within the sleeve. There is no disclosure in this document of a first anchor attached to a first end of the spring and threaded along the spring to pass a second end of the spring so that the first anchor exerts a compression force on the spring. Instead, the compression spring is applied directly by the rod.

US 2011/0269094 A1 discloses an orthodontic appliance which includes a tension spring for providing a continuous biasing force. The tension spring operates under extension.

U.S. Pat. No. 5,545,037 discloses an orthodontic device comprising a coiled spring which may be used under extension or compression. The arrangements of this document did not disclose a first anchor attached to a first end of the spring and threaded along the spring to pass a second end of the spring so that the first anchor exerts a compression force on the spring.

CN 101 816 591 A and CN 102 462 541 B disclose orthodontic appliances which include a spring which provides a biasing force under extension.

SUMMARY

A first embodiment of the invention extends to an orthodontic device comprising a biasing member and first and second anchors for attaching the biasing member within a patient's mouth, wherein the biasing member exerts a bias under compression, wherein the biasing member comprises a limiter for preventing movement of the biasing member past a predetermined limit, and wherein at least one of the first and second anchors is inelastic, wherein the biasing member exerts said bias in a linear direction, and said two anchors are orientated to place said biasing member under compression, and wherein said limiter is provided by a maximum compression of said biasing member, and wherein the biasing member is elongate and has a first end and a second end, wherein the first anchor is attached to the first end, and wherein the first anchor is threaded along the biasing member to pass the second end so that, in use, the first anchor exerts a compression force on the biasing member.

The limiter acts to prevent permanent deformation of the biasing member due to over-extension. Advantageously, the limit may be set so that the biasing member retains its elastic properties for repeated use. Furthermore, the conditions under which the biasing member operates can therefore be carefully controlled, helping to ensure that the life-span of the biasing member is extended.

This, in turn, reduces the frequency with which it is necessary to replace the biasing member, thereby increasing the potential effectiveness of treatments using devices according to embodiments of the invention.

The device may be configured to provide a pulling force between the first and second anchors. In this respect, a pulling force may refer to a force applied in a direction towards the biasing member.

The first and second anchors may be connected to the biasing member near distal ends of the biasing member and may be orientated to cross one another in use.

Accordingly, such embodiments are able to exert a pulling force when the biasing member is under compression. Pulling forces are needed for the treatment of certain classes of malocclusions.

A further advantage of embodiments of the invention is that such devices may be made sufficiently small to fit within the mouth of a patient. Therefore devices according to embodiments of the invention may be used to close gaps after tooth extraction, for example.

The second anchor may be attached to the second end, and wherein the second anchor may be threaded along the biasing member to pass the first end so that, in use, the second anchor exerts a compression force on the biasing member.

The biasing member may comprise a helical spring having a plurality of coils and the limiter may comprise the coils of the spring being placed in contact with one another when the helical spring is compressed.

The first anchor may be located within a helix described by the helical spring.

The second anchor may be located within a helix described by the helical spring.

The biasing member may comprise a plurality of compressible members, each compressible member being deformable under compression and wherein the limiter comprises at least one of said compressible members being placed under maximum compression.

Each of said plurality of compressible members may comprise at least one void and wherein either, or both, of the first and second anchors may be located with said void.

The biasing member may be adapted to exert said bias in a linear direction, and said two anchors may be orientated to place said biasing member under extension, and wherein said limiter may comprise a thread or a bracket attached to opposing ends of the biasing member to thereby limit a linear extension of the biasing member.

The orthodontic device may further comprise a first collar and a second collar, wherein the first and second collars are attached to the biasing member so that a force applied to either the first or the second collar places the biasing member under extension, wherein the first anchor is immovably attached to the first collar and movably attached to the second collar, wherein the limiter comprises a first stop attached the first anchor, said first stop preventing movement of the first anchor relative to the second collar past a predetermined limit.

The biasing member may be elongate and the first anchor may be threaded along the biasing member.

The second anchor may be immovably attached to the second collar and movably attached to the first collar, wherein the limiter may further comprise a second stop attached to the second anchor, said second stop preventing movement of the second anchor relative to the first collar past a predetermined limit.

The biasing member may be elongate and the second anchor may be threaded along the biasing member.

The biasing member may comprise a helical spring.

The first anchor and the second anchor may be located within a helix described by the helical spring.

The biasing member may comprise a plurality of extensible members, each extensible member being deformable under extension.

Each of the plurality of extensible members may comprise at least one void and wherein either, or both, of the first and second anchors may be located with said void.

Either, or both, the second and first anchors may be rigid.

Either, or both, the second and first anchors may comprise a hoop and wherein said hoop may be for attaching the anchor to a wire located in the patient's mouth.

Both the first and the second anchors may be inelastic.

The device may be made from a single, integral member. The single, integral member may be a wire.

The device may comprise two or more co-operating parts. According to an embodiment, the device comprises first and second parts, the first part comprising a first spring and a first anchor, the second part comprising a second spring and a second anchor, the device further comprising a connector, wherein the connector connects the first spring to the second spring. The first and second springs may be helical springs, in which case, the first anchor of the first part extends through a helix formed by the first spring, and the second anchor of the second part extends through a helix formed by the second spring, and wherein the connector connects the first spring to the second spring so that the first anchor extends through the helix of the second springs and the second anchor extends through the helix of the first spring.

If the device comprise two or more co-operating parts at least one of the parts may be formed from a single, integral member. The single, integral member may be a wire.

A further embodiment of the invention relates to an orthodontic device comprising a elongate spring defining a length, the spring having a plurality of spring elements, each spring element being deformable under compression and being situated along the length of the spring so that the spring exerts a bias when placed under compression, wherein each of the spring elements is arranged so that compression of the spring causes the spring elements to be brought into closer proximity with one another, the spring having a maximum compression when the spring elements are in contact with one another; wherein the device further comprises a first anchor and a second anchor, the first and second anchors extending along the length of the spring away from the spring in respective extension directions and each anchor being attached to the spring at a location distal to the extension direction of that anchor so that each anchor extends along the spring for at least a portion of the length thereof.

A further embodiment of the invention relates to a method of manufacturing an orthodontic device, the method comprising providing a biasing member and first and second anchors for attaching the biasing member within a patient's mouth, wherein the biasing member exerts a bias under compression or extension, wherein the biasing member comprises a limiter for preventing movement of the biasing member past a predetermined limit, and wherein at least one of the first and second anchors is inelastic.

The biasing member may exert said bias in a linear direction, and wherein said two anchors may be orientated to place said biasing member under compression, and wherein said limiter may be provided by a maximum compression of said biasing member.

The biasing member may be elongate and may have a first end and a second end, wherein the first anchor is attached to the first end, and wherein the first anchor may be threaded along the biasing member to pass the second end so that, in use, the first anchor exerts a compression force on the biasing member.

The second anchor may be attached to the second end, and wherein the second anchor may be threaded along the biasing member to pass the first end so that, in use, the second anchor exerts a compression force on the biasing member.

The biasing member may comprise a helical spring having a plurality of coils and wherein the limiter may comprise the coils of the spring being placed in contact with one another when the helical spring is compressed.

The first anchor may be located within a helix described by the helical spring.

The second anchor may be located within a helix described by the helical spring.

The biasing member may comprise a plurality of compressible members, each compressible member being deformable under compression and wherein the limiter may comprise at least one of said compressible members being placed under maximum compression.

Each of said plurality of compressible members may comprises at least one void and wherein either, or both, of the first and second anchors are located with said void.

Each of said plurality of compressible members may comprise an elastic member.

Each of said plurality of compressible members may further comprise a spacer wherein said at least one void is formed in said spacer.

The biasing member may be adapted to exert said bias in a linear direction, and wherein said two anchors are orientated to place said biasing member under extension, and wherein said limiter comprises a bracket attached to opposing ends of the biasing member to thereby limit a linear extension of the biasing member.

The orthodontic device may further comprise a first collar and a second collar, wherein the first and second collars are attached to the biasing member so that a force applied to either the first or the second collar places the biasing member under extension, wherein the first anchor is immovably attached to the first collar and movably attached to the second collar, wherein the limiter comprises a first stop attached the first anchor, said first stop preventing movement of the first anchor relative to the second collar past a predetermined limit.

The biasing member may be elongate and the first anchor may be threaded along the biasing member.

The second anchor may be immovably attached to the second collar and movably attached to the first collar, wherein the limiter may further comprise a second stop attached to the second anchor, said second stop preventing movement of the second anchor relative to the first collar past a predetermined limit.

The biasing member may be elongate and the second anchor may be threaded along the biasing member.

The biasing member may comprise a helical spring.

The first anchor and the second anchor may be located within a helix described by the helical spring.

The biasing member may comprise a plurality of extensible members, each extensible member being deformable under extension.

Each of the plurality of extensible members may comprise at least one void and wherein either, or both, of the first and second anchors may be located with said void.

Either, or both, the second and first anchors may be rigid.

Either, or both, the second and first anchors may comprise a hoop and wherein said hoop is for attaching the anchor to a wire located in the patient's mouth.

Both the first and the second anchors may be inelastic.

DESCRIPTION OF ACCOMPANYING FIGURES

Embodiments of the invention are described with reference to the accompanying schematic diagrams where:

FIGS. 22, 23, and 24 illustrate aspects of an orthodontic device according to a further embodiment of the invention;

DESCRIPTION OF EMBODIMENTS

Figure 1:
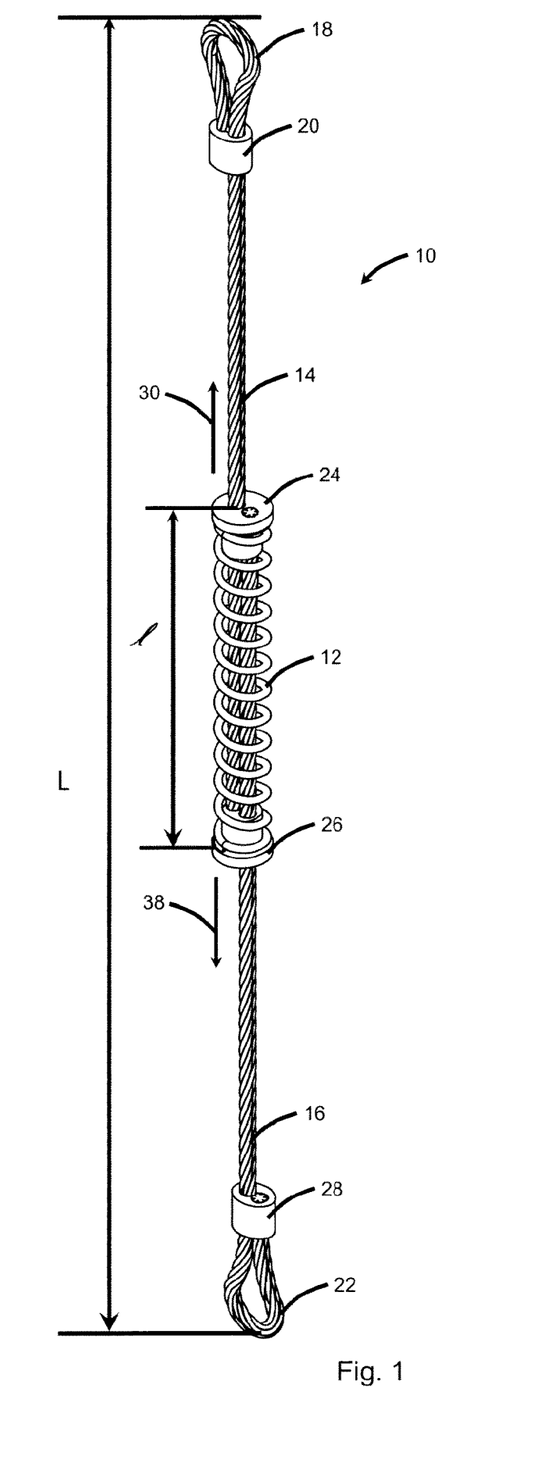
FIG. 1 illustrates an orthodontic device according to a first embodiment of the invention.

FIG. 1 illustrates an orthodontic device 10 according to a first embodiment of the invention. The device 10 comprises a coiled spring 12, a first steel rope 14 and a second steel rope 16. The first steel rope 14 is formed with a hoop 18 which is secured by clamp 20. Second steel rope 16 is formed with a hoop 22 which is secured by clamp 28. Steel rope 14 is secured to the spring 12 by collar 26, whereas steel rope 16 is secured to spring 12 by collar 24.

Figure 2:
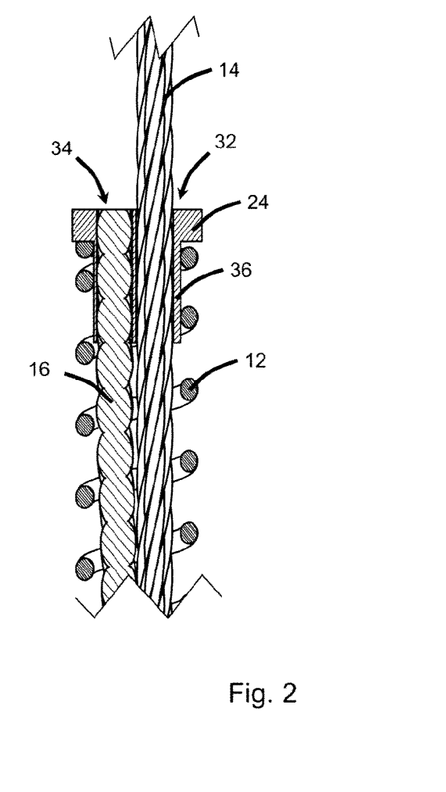
FIG. 2 illustrates the orthodontic device of FIG. 1 in partial cross-section.

The manner in which steel rope 16 is secured to spring 12 by collar 24 is shown in greater detail in FIG. 2. Collar 24 is formed with a void 34 in which the end of steel rope is located and secured therein by glue, although other methods of securing such as crimping, welding, soldering etc. may be used. The collar 24 includes a neck 36. The spring 12 and the neck 36 co-operate so that the spring 12 is attached to the collar 24 at the neck 36.

The collar 24 is further formed with a second void 32 through which the steel rope 14 is threaded so that the steel rope 14 is able to move relative to the collar 24. Although not illustrated in FIG. 2, the collar 26 is arranged in a manner similar to that of collar 24 and steel rope 14 is secured to spring 12 by collar 26 in this way.

Referring back to FIG. 1, it can be seen that steel ropes 14 and 16 are located within the helix formed by the helical spring 12. Since steel rope 14 is fixed to collar 26, but moves relative to collar 24, whereas steel rope 16 is fixed to collar 24, but moves relative to collar 26, the spring 12 may exert a bias by being placed under compression when the respective hoops 18 and 22 are displaced away from one another.

In use, the hoops 18 and 22 attach directly, or indirectly to teeth in a patient's mouth, as described in greater detail below. Therefore the steel ropes 14 and 16 act as anchors. Furthermore, since the steel ropes 14 and 16 are inelastic, as the hoops 18 and 22 move further away from each other, the extension limit of the device 10 is reached when the coils of the spring 12 meet one another. Therefore the coils of the spring 12 serve as a limiter, limiting the extent to which the spring 12 is able to deform.

Advantageously, the spring 12 does not lose its elastic properties when compressed to the full extent and therefore, exerting an unexpected force or displacement between the hoops 18 and 22 will not cause the spring 12 to deform, or otherwise lose its ability to apply a bias.

The orthodontic device 10 illustrated in FIG. 1 is elongate and has a defined longest dimension, length 'L'. Similarly, the spring 12 has a length 'l'. The steel ropes 14 and 16 extend away from the spring along length L, in opposite directions. Steel rope 14 extends in direction 30, whereas steel rope 16 extends away from spring 12 in direction 38. The steel rope 14 is attached to the spring 12 by collar 26 which is located at end of the spring away from the direction 30 of extension of that steel rope 14. Similarly, steel rope 16 is attached to the spring 12 by collar 24 which is located at the end of the spring away from the direction 38 of extension of that steel rope 16.

Therefore, the steel ropes 14 and 16 extend along a portion of the length 'l' of the spring 12. This allows the anchors to exert a pulling force when the spring 12 is placed under compression.

Although the steel ropes 14 and 16 are shown as connected to the ends of the spring 12, it is to be realised that in further embodiments of the invention, the steel ropes may be located along the length 'l' of the spring 12.

The above description of the steel ropes 14 and 16 and their location relative to the spring also applies to the other embodiments of the invention described below.

According to embodiments of the invention, the anchor means are connected to the biasing member near distal ends of the biasing member and are orientated to cross one another in use. This allows a biasing member (such as spring) which is capable of exerting a bias in both extension and compression to be used in compression without significant adaptive design considerations.

Figure 3:
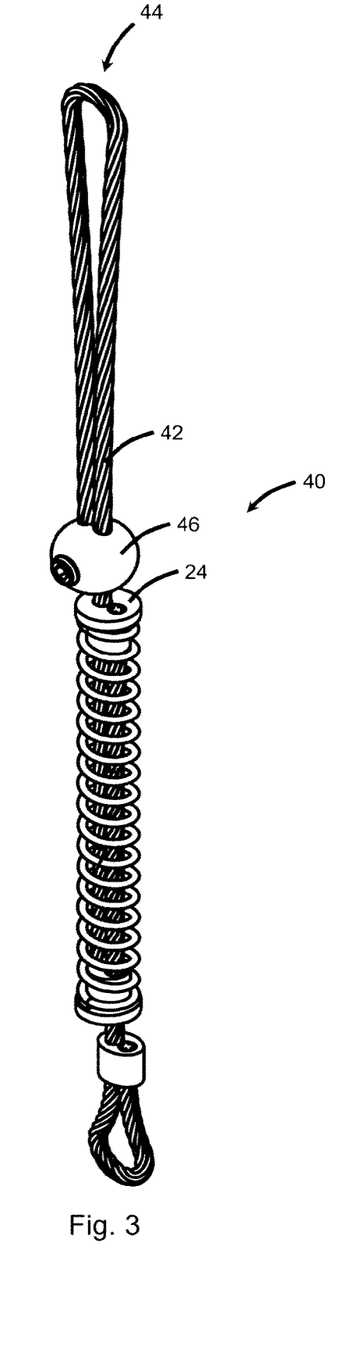
FIG. 3 illustrates an orthodontic device according to a further embodiment of the invention.

FIG. 3 illustrates an orthodontic device 40 according to a further embodiment of the invention. Like numerals are used to denote like components to previously described embodiments in all of the Figures described herein. The device 40 includes a steel rope 42 which is formed in an elongate hoop 44. A screw clamp 46 serves to form the hoop 44 by clamping an end of the steel rope 42 to an intermediate point of steel rope 42.

Figures 4, 5, 6, 7:
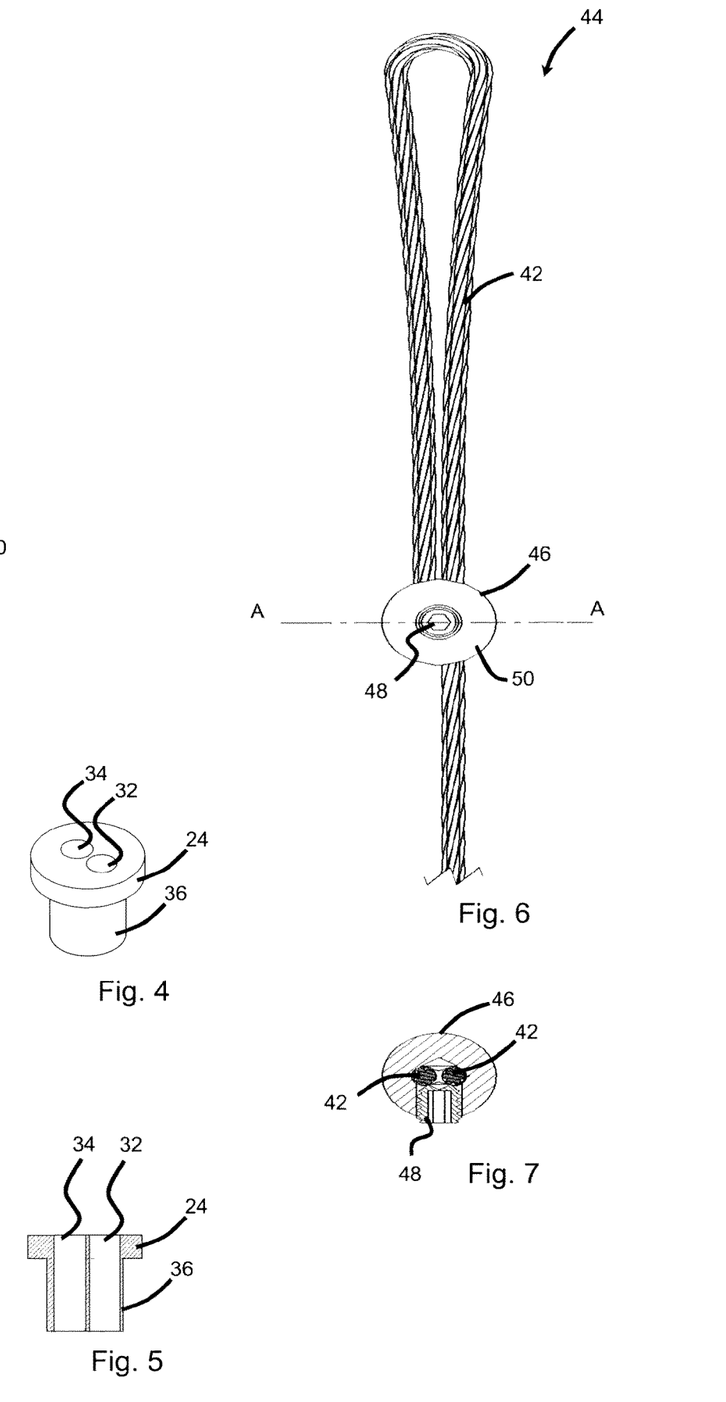
FIGS. 4 to 7 illustrate details of the orthodontic device of FIG. 3.

The screw clamp 46 is illustrated in FIG. 6, and in cross-section along line A-A in FIG. 7. The screw clamp 46 includes a screw 48 (partially shown in FIG. 7) which co-operates with a clamp head 50 to attach the end of the steel rope 42 to an intermediate point of steel rope 42 and thereby form hoop 44. The advantage of the screw clamp 46 is that this may be reused. A device according to the invention incorporating such a screw clamp may be easily shortened and the screw clamp reused. Crimp clamps do not generally allow reuse.

FIGS. 4 and 5 illustrate details of the clamp 24 described above.

Figure 8:
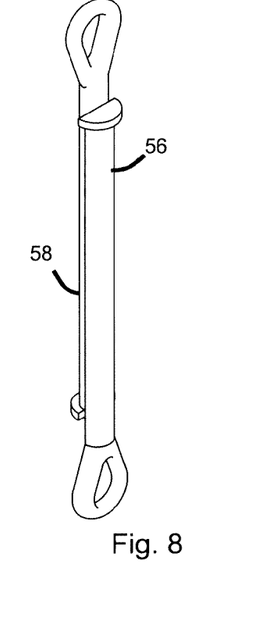
FIGS. 8 to 11 illustrate aspects of an orthodontic device according to a further embodiment of the invention.
Figure 9:
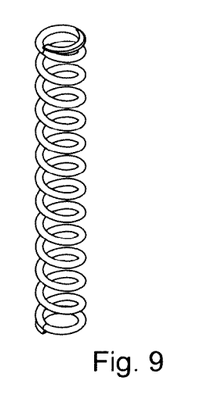
Figures 10, 11, 12:
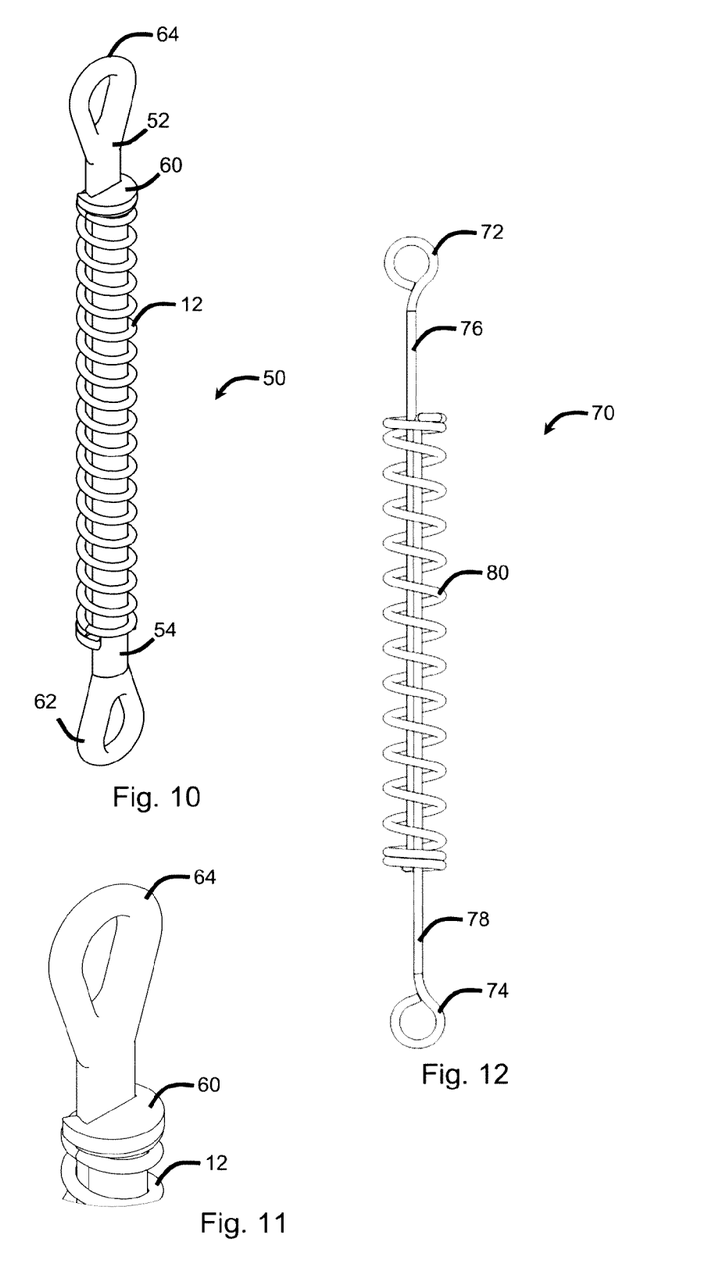
FIG. 12 illustrates an orthodontic device according to a further embodiment of the invention.

FIG. 10 illustrates an orthodontic device 50 according to a further embodiment of the invention. The device 50 includes two shafts 52 and 54 which have a semi-circular cross-section so that the shafts 52 and 54 may move relative to one another. Similar shafts 56 and 58 are illustrated in FIG. 8.

Referring back to FIG. 10, the shaft 54 is formed with foot 60. Shaft 52 is formed with a similar foot although this is not visible in FIG. 10. Shaft 54 is further formed with an eyelet 62; shaft 52 is formed with an eyelet 64. In use the eyelets 62 and 64 are attached directly or indirectly to teeth in a patient's mouth. The eyelets 62 and 64, together with the shafts 52 and 54, therefore act to anchor the device 50.

The spring 12 is connected to the feet of the shafts 52 and 54 so that the spring 12 may exert a bias by being placed under compression when the eyelets 62 and 64 away from one another.

The device 50 illustrated in FIG. 10 differs from the device 10 of FIG. 1 in that the shafts 52 and 54 having respective feet and eyelets are formed as single integrated pieces which are rigid.

FIG. 12 illustrates an orthodontic device 70 according to a further embodiment of the invention. The device 70 is formed from a single wire which is shaped to form the requisite parts. The device 70 is formed with eyelets 72 and 74 at respective ends. The device is further formed with shafts 76 and 78, and with central helical spring 80. The shafts 76 and 78 are located in the helix of helical spring 80 and join the respective eyelets 72 and 74 to ends of the helical spring opposite to the position of that eyelet so that movement of the eyelets 72 and 74 toward one another causes compression of the spring.

The device 70 illustrated in FIG. 12 operates in the same manner as the devices described above. The device 70 differs from the devices previously described in that the device 70 is formed from a single wire which, in this embodiment, is nickel titanium, although other metals with suitable elastic properties may be used instead.

Figure 13:
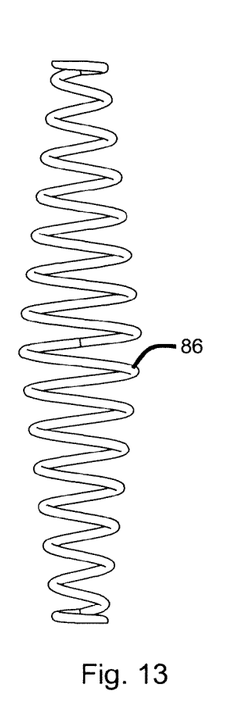
FIG. 13 illustrates a spring for use with an orthodontic device according to a further embodiment of the invention.

FIG. 13 illustrates a spring 86 for use with an orthodontic device according to a further embodiment of the invention. The springs 12 and 80 are formed as helical cylinders. The spring 86 illustrated in FIG. 13 is formed as a non-cylindrical helix. It is to be realised that other shapes are possible.

The integral device 70 illustrated in FIG. 12 suffers from the disadvantage that it is difficult to make since it is comprised from a single wire. FIG. 16 illustrates an orthodontic device 90 according to a further embodiment of the invention. The device 90 is comprised of two substantially similar parts: 92 and 94 joined together. Part 92 is illustrated in FIG. 15 and comprises a shaft 96 and a spring 98. The two parts 92 and 94 are joined together by plug 100 which is illustrated in greater detail in FIG. 14. The plug 100 comprises a void 102 which is formed to accommodate the two shafts of the two parts 92 and 94, as illustrated in FIG. 16. As further illustrated in FIG. 16, the part 92 is formed with eyelets 104 for attachment, directly or indirectly, to teeth in a patient's mouth.

Figure 14:
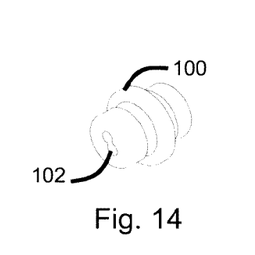
FIGS. 14 to 16 illustrate aspects of an orthodontic device according to a further embodiment of the invention.
Figure 15:
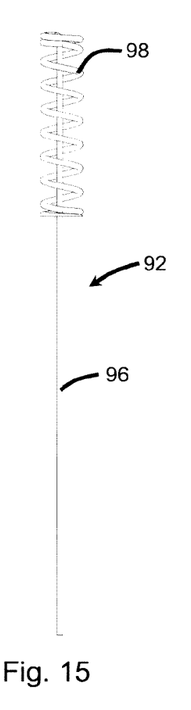
Figure 16:
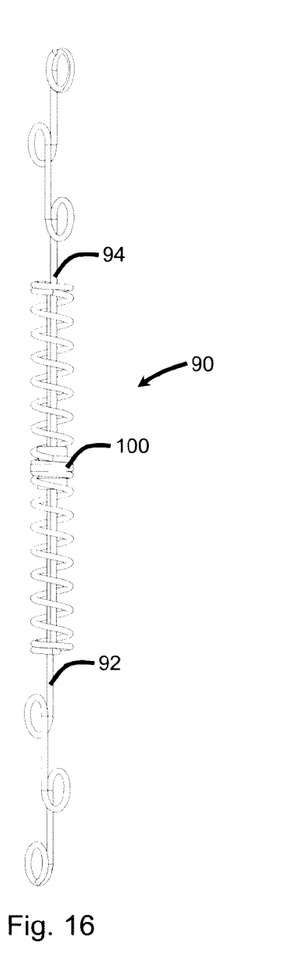

It is to be realised that the device 90 of FIGS. 14 to 16 operates in the same manner as the devices described above. In addition, the device 90 is substantially simpler to manufacture than the device 70 of FIG. 12 as the two parts 92 and 94 are substantially the same and may therefore be mass-produced.

Figure 17:
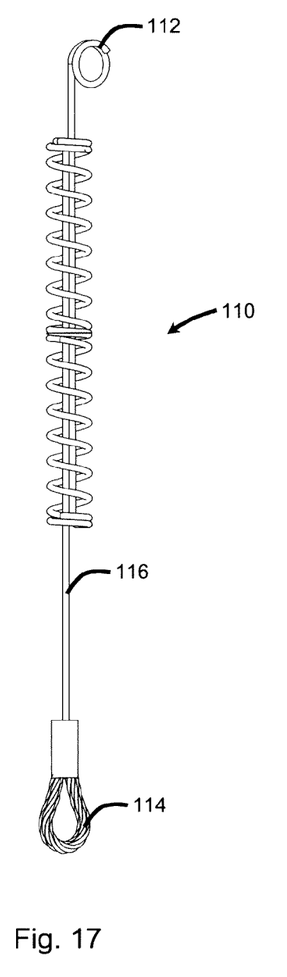
FIGS. 17 to 19 illustrate orthodontic devices according to further embodiments of the invention.
Figure 18:
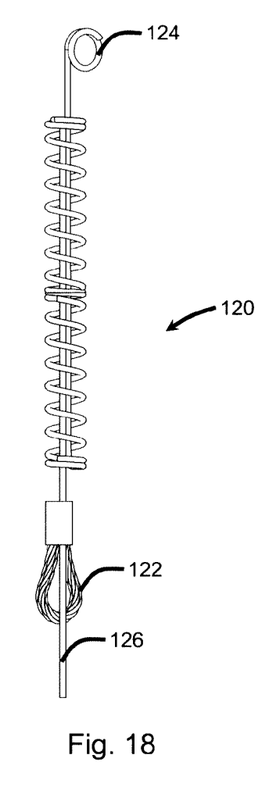
Figure 19:
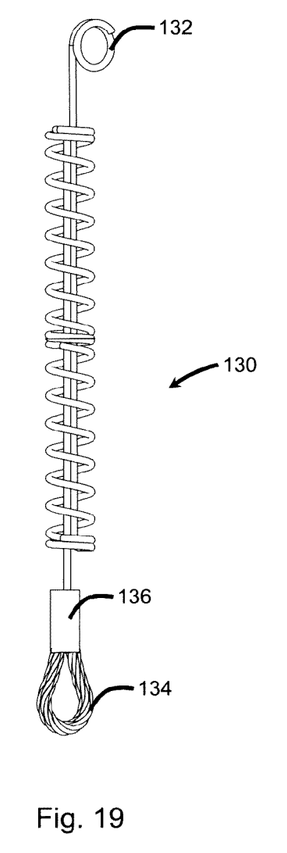

In a further embodiment, an orthodontic device is made from two parts which are configured to engage with one another FIGS. 17, 18 and 19 illustrate respective orthodontic devices 110, 120 and 130 according to further embodiments of the invention. These devices are similar to the device 90 illustrated in FIG. 15 and are all formed from two similar parts. However, these devices differ from the device 90 in that they comprise different structures for attaching to teeth in a patient's mouth. The device 110 comprises an eyelet 112 and a hoop 114 attached to the end of shaft 116. The device 120 comprises an eyelet 124 and a hoop 122 attached at an intermediate point along shaft 126. Device 130 comprises an eyelet 132 and a hoop 134 attached at the end of a fore-shortened shaft 136.

Figure 20:
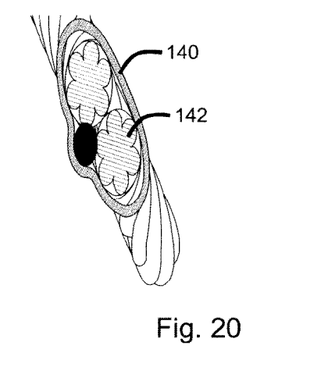
FIGS. 20 and 21 illustrate aspects of orthodontic devices according to further embodiments of the invention.
Figure 21:
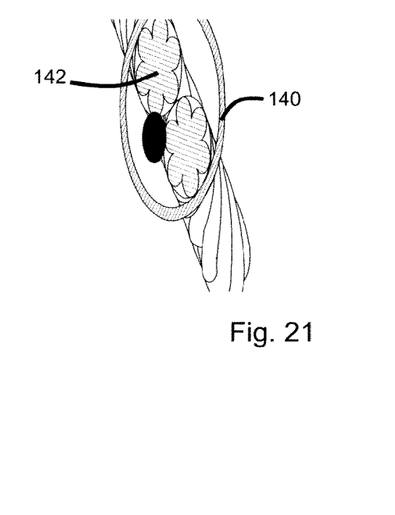

FIGS. 21 and 22 illustrate a manner of forming the various hoops described above. As described, the hoops comprise a clamp 140 which acts to clamp two portions of the steel rope 142 together. In this embodiment, the clamp 140 is crimped to the steel rope 142. FIG. 21 shows the clamp 140 prior to crimping, whereas FIG. 20 shows the clamp 140 after crimping.

Figure 22:
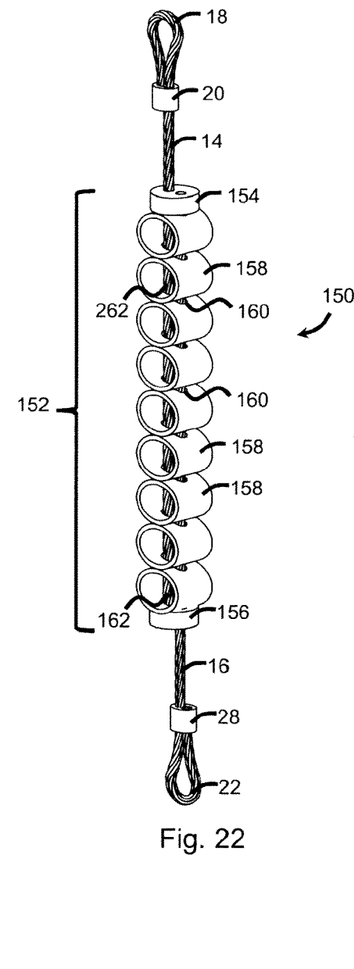
FIG. 22 illustrates an orthodontic device according to a further embodiment of the invention.

FIG. 22 illustrates an orthodontic device 150 according to a further embodiment of the invention. The device 150 comprises a spring 152, a first steel rope 14 and a second steel rope 16. The first steel rope 14 is formed with a hoop 18 which is secured by clamp 20. Second steel rope 16 is formed with a hoop 22 which is secured by clamp 28. Steel rope 14 is secured to the spring 12 by collar 156, whereas steel rope 16 is secured to spring 12 by collar 154.

The spring 152 comprises a plurality of deformable elastic steel rings 158. Each of the rings is formed with an upper void 160 and a lower void 162 so that the steel ropes 14 and 16 may pass there through, as illustrated in FIG. 22. The steel rings are located between the collars 154 and 156 so that when the hoops 18 and 22 (which attach the device 150 within the mouth of a patient) move away from one another, the collars 154 and 156 move toward one another, thereby placing the individual steel rings 158 under compression. In this manner, the plurality of steel rings situated on the steel ropes 14 and 16 comprise a spring which exerts a bias when under compression in a linear direction along the steel ropes 14 and 16.

The compression of the spring 152 is limited since each of the steel rings 158 may not be compressed past the point where opposite sides of the ring touch. It is to be realised further that the spring 152 may also be used under extension since the extension of the spring will similarly be limited by the extent to which the rings 158 may be extended which is, in turn, determined by the point when the sides of the rings touch one another.

The steel rings 158 are here comprised of steel, but it is to be realised that any other suitable elastic material such as nickel titanium may be used instead.

Figure 23:
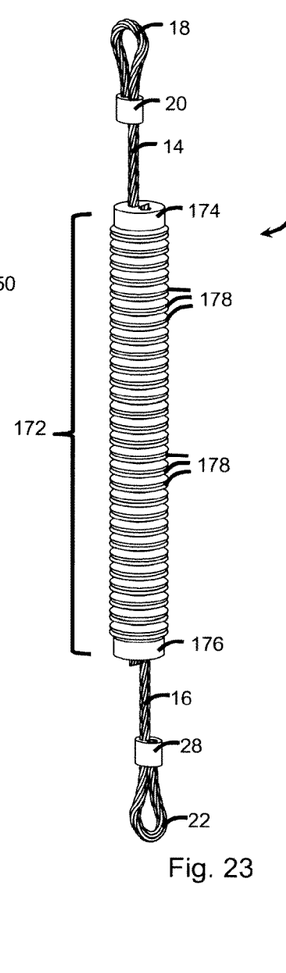

FIG. 23 illustrates an orthodontic device 170 according to a further embodiment of the invention. The device 170 comprises a spring 172, a first steel rope 14 and a second steel rope 16. The first steel rope 14 is formed with a hoop 18 which is secured by collar 20. Second steel rope 16 is formed with a hoop 22 which is secured by collar 28. Steel rope 14 is secured to the spring 12 by collar 176, whereas steel rope 16 is secured to spring 12 by collar 174.

The spring 172 comprises a plurality of clam springs 178. Each of the clam springs 178 is formed with an upper void 180 and a lower void 182 (see FIG. 24) so that the steel ropes 14 and 16 may pass there through, as illustrated in FIG. 22. The steel rings are located between the collars 174 and 176 so that when the hoops 18 and 22 (which attach the device 170 within the mouth of a patient) move away from one another, the collars 174 and 176 move toward one another, thereby placing the individual clam springs 178 under compression. In this manner, the plurality of steel rings situated on the steel ropes 14 and 16 comprise a spring which exerts a bias when under compression in a linear direction along the steel ropes 14 and 16. Clam springs 178 may also be referred to as 'disc springs'.

Figure 24:
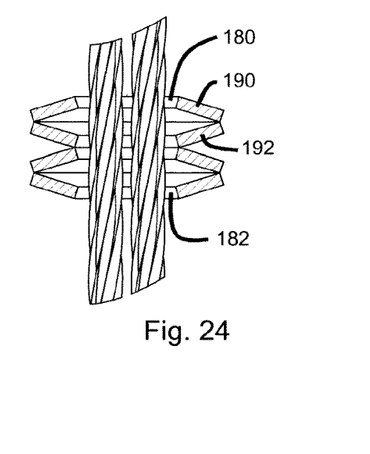

FIG. 24 illustrates the clam springs 178 in more detail. Each clam spring 178 is formed from an upper plate 190 and a lower plate 192. The upper plate 190 has the upper void 180 formed therein, whereas the lower plate 192 has the lower void 182 formed therein. The steel ropes 14 and 16 pass through the upper 180 and lower 182 voids.

The upper plate 190 acts against the lower plate 192 and each are constructed from an elastic material such as steel so that, under compression, they exert an opposing bias. Other materials such as nickel titanium may also be used.

Spring 172 may, under suitable circumstances, also be used under compression since the extension of the spring will be limited by the lateral sides of the discs 190 and 192 acting against the steel ropes 14 and 16.

Figure 25:
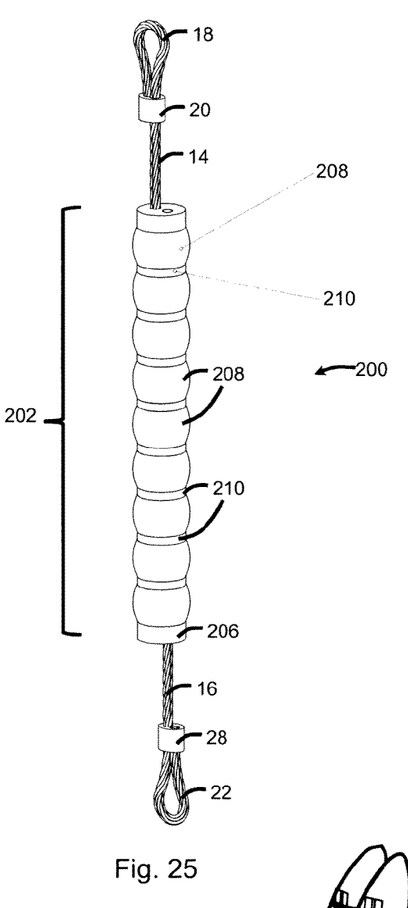
FIG. 25 illustrates an orthodontic device according to a further embodiment of the invention.

FIG. 25 illustrates an orthodontic device 200 according to a further embodiment of the invention. The device 200 is similar to the devices 150 and 170 described above and the further operation of the device 200 will not be further described herein. The device 200 comprises a spring 202 comprised of a plurality of elastomer units 208 separated by spacers 210. The spacers 210 have voids formed therein to allow the passage of the steel ropes 14 and 16. Collars 204 and 206 attach to the ends, respectively, of steel ropes 16 and 14, allowing the spring to exert a bias under compression. In this embodiment, the elastomer is silicon, but it is to be realised that many other materials with elastic properties may be used in addition to, or instead of, silicon.

In the embodiments of the invention described above, the steel ropes 14 and 16 engage with the respective springs 12, 80, 98, 152, 172 and 202 so that the springs apply a bias when under compression. In this respect, the steel ropes are threaded through a portion of the springs, for example, the collars 24 and 26 of the device 10 illustrated in FIG. 1. It is to be realised that other forms of threading may be used instead such as, for example, hoops. The important feature of embodiments of the invention is that the steel ropes 14 and 16 are attached at opposite sides of the spring to the sides where they attach to the patient's mouth and that by being threaded through the spring, undesired movement of the spring relative to the steel ropes (for example, rotation) may be prevented when forces are applied to the steel ropes.

In this respect, as previously noted, the springs described above are elongate springs, at least in so far as the spring has an elongate structure having a length greater than other dimensions of the spring. Furthermore, these springs exert their bias along this length. However, this is not necessary for embodiments of the invention. In particular, although the bias of the spring may be exerted along a line, the spring may be curved to better fit within a patient's mouth. Furthermore, other elongate springs such as curved springs may be used instead.

In further embodiments of the invention, other types of members for applying a bias may be used. For example, biasing members of devices according to the invention may be made from stainless steel, nickel titanium (Nitinol), resins, filled resins filled with, for example, glass balls, ceramic particles or fibres, or any other elastic material.

FIGS. 26 to 32 illustrate orthodontic devices according to embodiments of the invention installed in the mouth of a patient. In these Figures, the device illustrated is the device 10 shown in FIGS. 1 and 2, and described in greater detail above. However, it is to be realised that any of the other embodiments of the invention may be used in the same way.

Figure 26:
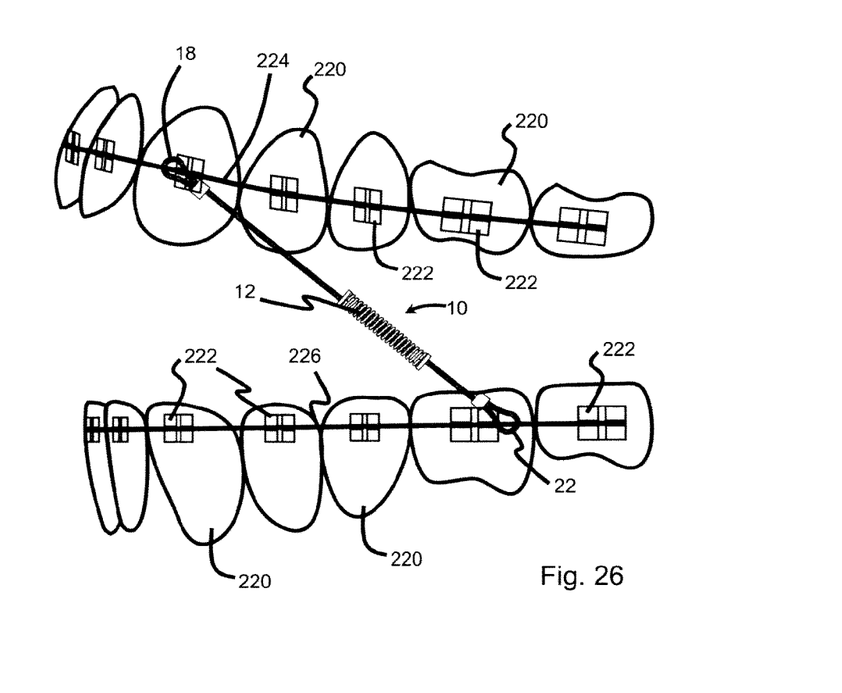
FIGS. 26 to 32 illustrate orthodontic devices according to embodiments of the invention installed in the mouth of a patient.

FIG. 26 illustrates the device installed in a patient's mouth. The teeth 220 of the patient have brackets 222 attached thereto in a manner known in the art. A steel wire 224 is attached to the brackets 222 of the upper teeth of the patient and steel wire 226 is attached to the steel brackets 222 of the lower teeth of the patient.

The hoop 18 of device 10 is connected to the steel wire 224 whereas the hoop 22 of device 10 is connected to steel wire 226. Therefore, as the patient opens and closes her mouth, the hoop 18 is moved away from the hoop 22, and the spring 12 is compressed, thereby exerting a bias between the hoop 18 and the hoop 22, in the manner described above.

Figure 27:
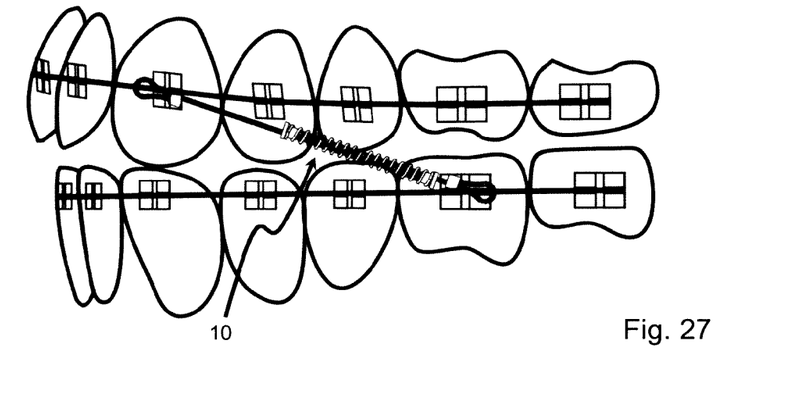

FIG. 27 illustrates the installation of the device 10 when the patient's mouth is closed, and the spring 12 exerts a reduced bias that when the mouth is open (FIG. 26).

Figure 28:
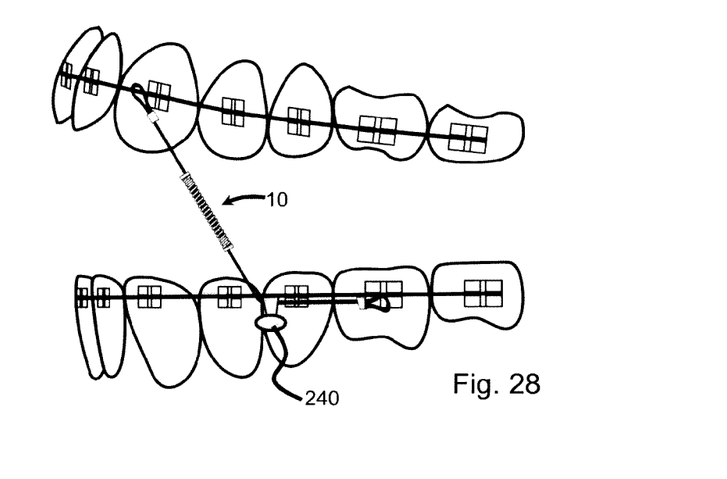
Figure 29:
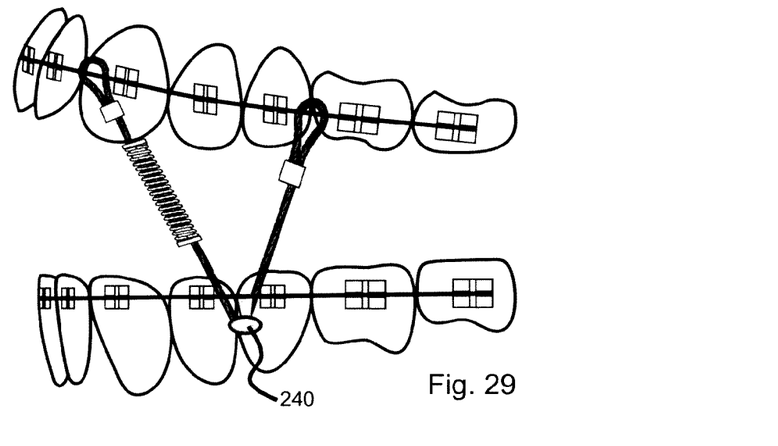

FIG. 28 illustrates an alternate installation of the device 10 in a patient's mouth. In this installation, a pulley 240 is attached in the patient's mouth so that the bias exerted by spring 12 may be directed in a desired manner. As illustrated in FIG. 29, the pulley 240 may also be used with other installations.

Figure 30:
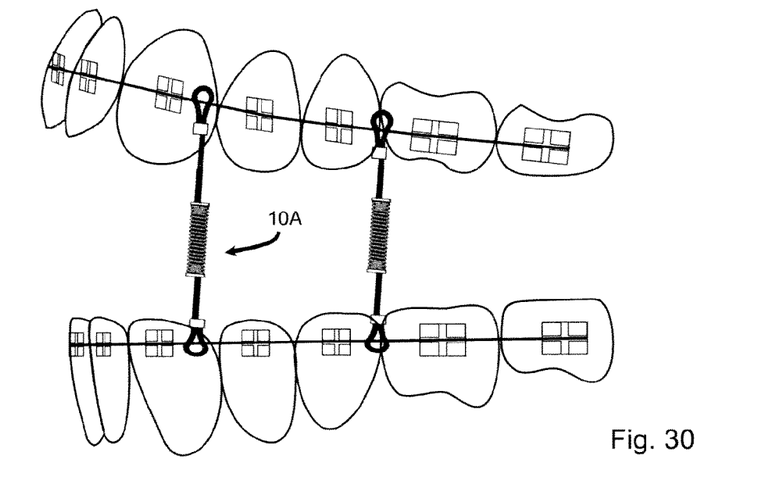

FIG. 30 illustrates the use of two similar devices, 10A and 10B.

Figure 31:
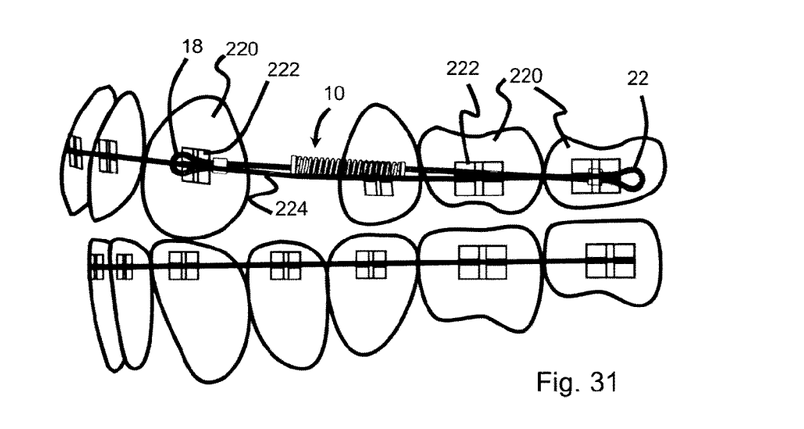

It is not necessary for devices according to the invention to apply a bias between upper and lower teeth of a patient. FIG. 31 illustrates the use of the device 10 where the hoop 18 and the hoop 22 are attached to the wire 224 between the brackets 222 of the upper teeth. Therefore, in this installation, the device 10 exerts a bias between upper teeth of the patient.

Figure 32:
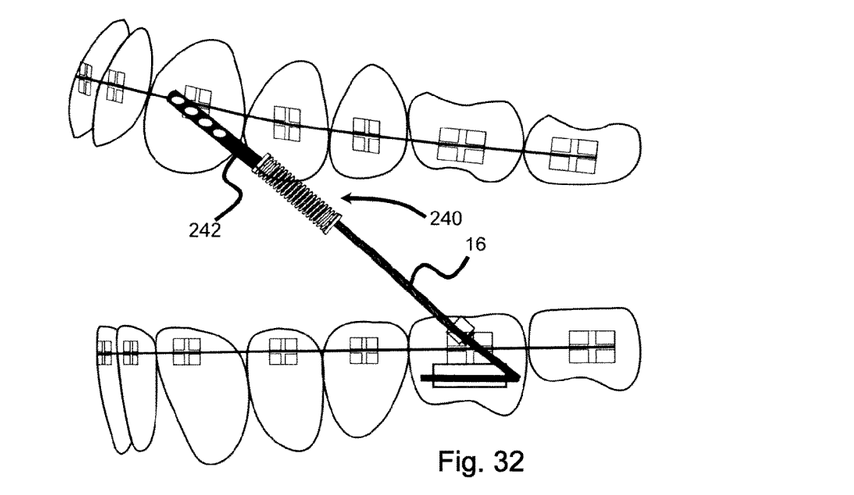

FIG. 32 illustrates an installation of a device 240 according to a further embodiment of the invention. The device 240 is similar to the device 10 described above, but the device 240 comprises an elastic 242 instead of steel wire 14.

The embodiments described above relate to springs operating under compression. The advantage of such springs is that a limit to the movement of the spring is created by structural elements of the spring itself. For example the coils of the helical spring prevent that spring from being compressed past a certain point. However, extension springs may also be used, provided that a limiter to prevent the extension of the spring past a predetermined point is provided, as described above with reference to FIGS. 23 and 24. As a further example, a helical spring such as spring 12 described above may be used in extension in conjunction with a thread or bracket joining the opposite ends of the spring. Such a thread or bracket will allow a limited amount of movement, but would prevent the spring from reaching a point of extension where the elastic properties of the spring would be reduced. Limiters other than a thread may also be used.

Figures 33, 34:
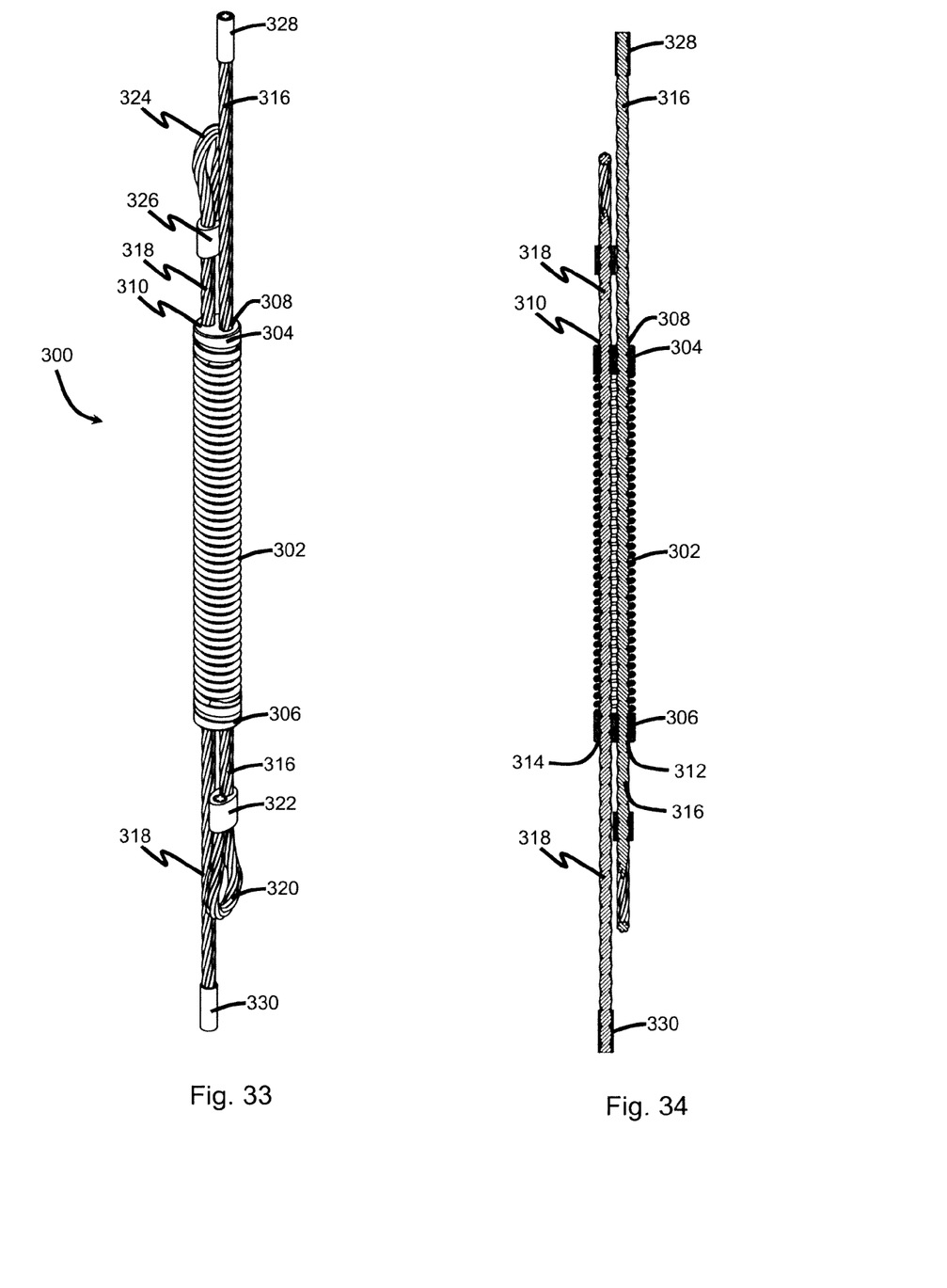
FIGS. 33 and 34 illustrate an orthodontic device according to a further embodiment of the invention.

FIGS. 33 and 34 illustrate an embodiment comprising a spring operating under extension. FIG. 33 illustrates an orthodontic device 300 comprising a helical spring 302. FIG. 34 illustrates the device 300 in longitudinal cross-section.

The device 300 includes two collars: collar 304 and collar 306 attached to either end of the spring 302. Collar 304 is formed with two voids 308. Similarly, collar 306 is formed with two voids 312 and 314. The device 300 further comprises two steel ropes 316 and 318. Steel rope 316 is located within void 308 of collar 304, to which it is attached, and within void 312 of collar 306, relative to which the steel rope 316 may move. Steel rope 318 is located within void 310 of collar 304, to which it is attached, and within void 314 of collar 306, relative to which the steel rope 318 may move.

The steel ropes 316 and 318 therefore extend through the spring 302 and are located with the helix formed by the spring 302.

Steel rope 316 is formed with a hoop 320 formed by a clamp 322 attaching a portion of the end or the steel rope 316 to a position near the end and a similar clamp 326 forms a hoop 324 in steel rope 318. The hoops 320 and 324 serve to anchor the device 300 during use in a manner similar to the hoops 18 and 22 of the device 10 illustrated in FIG. 1.

An aglet 328 is attached to the end of steel rope 316 at the opposite end to the hoop 320. Similarly, an aglet 330 is attached to steel rope 318 at the opposite end to the hoop 324.

When the hoops 320 and 324 are pulled away from one another, since steel rope 316 is attached to collar 306 and steel rope 318 is attached to collar 304, the spring 302 will expand. As the hoops 320 and 324 continue to move away from one another, acting against the bias of the spring 302, the steel rope 316 will move relative to collar 304 and the steel rope 318 will move relative to collar 306. However, continued expansion of the spring 302 will be stopped when the aglet 328 attached to steel rope 316 is brought into contact with the collar 304 and when the aglet 330 attached to steel rope 318 is brought into contact with the collar 306.

In this manner, the aglets 328 and 330 act as limiters to limit the extension of the spring 302. This prevents the helical spring 302 from over-extending and thereby becoming permanently deformed.

Although the spring 302 is a helical spring, it is to be realised that other biasing members could be used instead. For example, the springs 152 and 172 illustrated in FIGS. 22 and 23 may also be used with the configuration illustrated in FIGS. 33 and 34.

Figure 35:
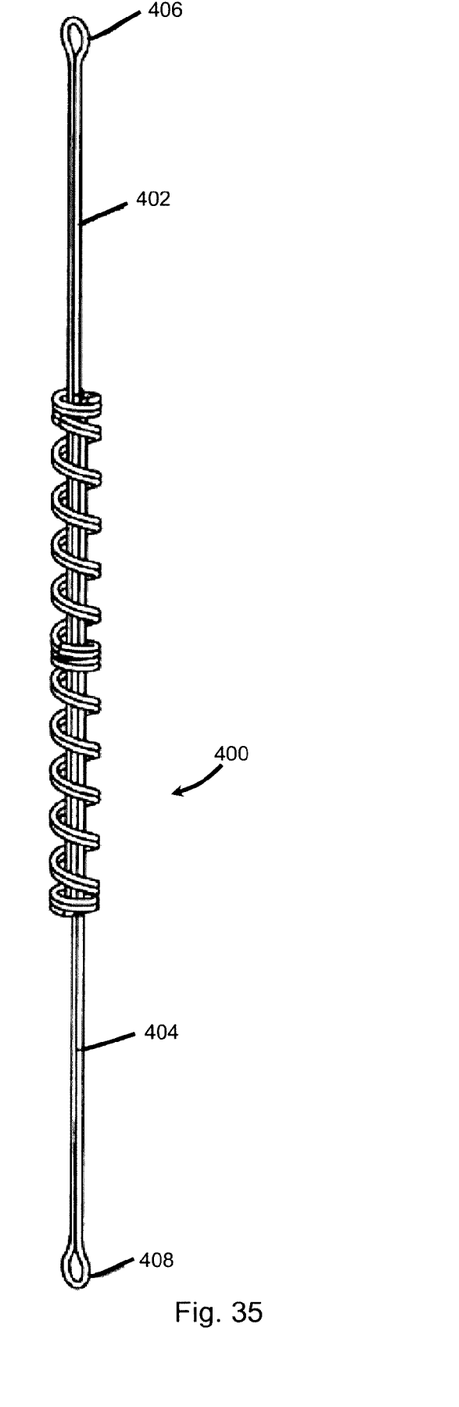
FIG. 35 illustrates an orthodontic device according to a further embodiment of the invention.

FIG. 35 illustrates a device 400 which comprises two similar parts 400 to 404 join together. The device 400 illustrated in FIG. 35 is similar to the device 90 illustrated in FIGS. 14 to 16, but differs in that it does not require a plug to join the two parts. The device 400 includes two islets 406 and 408 for attachment, directly or indirectly, to teeth in a patient's mouth.

The invention claimed is:

1. An orthodontic device comprising a biasing member and first and second anchors for attaching the biasing member within a patient's mouth, wherein the biasing member under compression exerts a pulling force on the first and second anchors, wherein the biasing member comprises a limiter for preventing movement of the biasing member past a predetermined limit due to over-extension of the device, and wherein at least one of the first and second anchors is inelastic, wherein the biasing member exerts said bias in a linear direction, and wherein said two anchors are orientated to place said biasing member under compression, and wherein said limiter is provided by a maximum compression of said biasing member, and wherein the biasing member is elongate and has a first end and a second end, wherein the first anchor is attached to the first end, and wherein the first anchor extends along the biasing member to pass the second end so that, in use, the first anchor exerts a compression force on the biasing member, wherein the orthodontic device comprises a first part and a second part wherein the first and second parts co-operate, wherein the first part comprises a single integral member that includes a first spring and the first anchor, and wherein the second part comprises a single integral member that includes a second spring and the second anchor, wherein the biasing member comprises the first spring and the second spring, wherein the first and second springs are helical springs, and wherein the first anchor of the first part extends through a helix formed by the first spring, and the second anchor of the second part extends through a helix formed by the second spring, and wherein the first anchor extends through the helix of the second spring and the second anchor extends through the helix of the first spring.

2. The orthodontic device according to claim 1 wherein the first anchor is directly attached to the first end.

3. The orthodontic device according to claim 1 wherein the second anchor is attached to the second end, and wherein the second anchor extends along the biasing member to pass the first end so that, in use, the second anchor exerts a compression force on the biasing member.

4. The orthodontic device according to claim 2 wherein said first and second helical springs have a plurality of coils and wherein the limiter comprises the coils of each spring being placed in contact with one another when each of the helical springs is compressed.

5. The orthodontic device according to claim 1 wherein either, or both, the second and first anchors are rigid.

6. The orthodontic device according to claim 1 wherein either, or both, the second and first anchors comprises a hoop and wherein said hoop is for attaching the anchor to a wire located in the patient's mouth.

7. The orthodontic device according to claim 1 wherein both the first and the second anchors are inelastic.

8. The device according to claim 1 wherein the device further comprises a connector, wherein the connector connects the first spring to the second spring.

9. The orthodontic device according to claim 1 wherein at least one of the single integral member of the first part and the single integral member of the second part is a wire.

* * * * *